US012775538B2

(12) United States Patent
Queiroz de Macedo et al.

(10) Patent No.: US 12,775,538 B2
(45) Date of Patent: Oct. 27, 2026

(54) DEVICE SUITABILITY DETERMINATIONS

(71) Applicant: HEWLETT-PACKARD DEVELOPMENT COMPANY, L.P., Spring, TX (US)

(72) Inventors: Augusto Queiroz de Macedo, Porto Alegre (BR); Charles Ricardo Staub, Porto Alegre (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 1094 days.

(21) Appl. No.: 17/689,736

(22) Filed: Mar. 8, 2022

(65) Prior Publication Data

US 2023/0289272 A1 Sep. 14, 2023

(51) Int. Cl.

*G06F 11/30* (2006.01)
*G06F 11/34* (2006.01)
*G06N 3/02* (2006.01)

(52) U.S. Cl.

CPC ...... *G06F 11/3058* (2013.01); *G06F 11/3438* (2013.01); *G06N 3/02* (2013.01)

(58) Field of Classification Search

CPC ... G06F 11/3058; G06F 11/3438; G06N 3/02; G06N 3/0455; G06N 3/044; G06N 3/088; G06N 3/084

USPC .......... 702/182

See application file for complete search history.

(56) References Cited

U.S. PATENT DOCUMENTS 6,718,277 B2 * 4/2004 Sharma .......... F24F 11/30 702/132
2021/0157312 A1 * 5/2021 Cella .......... G06Q 30/06
2026/0093646 A1 * 4/2026 Cooper .......... G06F 13/20

* cited by examiner

*Primary Examiner* — Aditya S Bhat

(74) *Attorney, Agent, or Firm* — Quarles & Brady LLP

(57) ABSTRACT

In an example in accordance with the present disclosure, a computing device is described. The computing device includes a database with a thermal dataset acquired during usage of a device. The computing device also includes a processor which trains a neural network to determine suitability of the device for a user of the device based on the thermal dataset. The neural network includes 1) an encoder trained to transform the thermal dataset to a first embedding vector, 2) a compression/decompression component trained to generate a second embedding vector that minimizes a difference from the thermal dataset based on the first embedding vector, and 3) a decoder trained to generate a second thermal dataset from the second embedding vector.

15 Claims, 6 Drawing Sheets

DEVICE SUITABILITY DETERMINATIONS

BACKGROUND

There are numerous types of electronic devices used in the world today and each electronic device includes many hardware components. For example, a computing device includes processors, memory devices, and other integrated circuits. These components consume electrical power to function.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
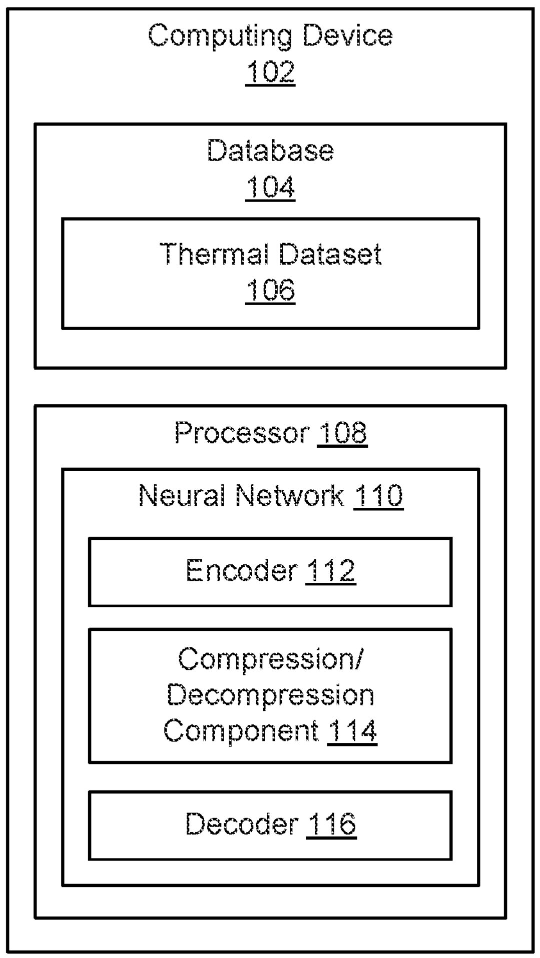
FIG. 1 is a block diagram of a computing device for determining device suitability, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Electronic devices have become widespread in today's society and it is not uncommon for an individual to interact with multiple electronic devices on a daily basis. Electronic devices include integrated circuits to carry out their intended functionality. For example, a computing device may include a processor (e.g., a central processing unit (CPU), a graphics processing unit (GPU), etc.) to process instructions and data. While particular reference is made to particular electronic device components, millions of other types of electronic devices are manufactured, with great quantities produced daily.

Computing devices (e.g., personal computers (PCs), laptop devices, tablet devices, smartphones, etc.) have shrunk in size over the past decades, while the market demand for performance and longer battery life has continued to increase. Users of a computing device may have specific usage patterns based on the applications being used and activities being executed. For example, a computing device may face CPU and input/output (I/O) intensive workloads. In other examples, a computing device may be used for intensive network and video workloads. Each usage pattern may impose different loads on the thermal system of the computing device. As used herein, a "thermal system" includes a device or multiple devices used to dissipate heat generated by the computing device during usage. In some examples, the thermal system may also include components in the computing device that generate a heat load. For example, the thermal system may include a battery, processor, memory, or other components that contribute to the heat load of a computing device.

In some examples, during the development cycle of a new computing device, the thermal system design is developed to protect the computing device from damage and to facilitate optimum performance of the computing device. In some examples, the thermal system of a computing device may be developed based on expected usage patterns. For example, computing usage for multiple users may be observed to determine the design specifications for the thermal system. In some examples, the way that users use a given type of computing device (e.g., a given model of computing device) may be assessed.

During the design phase of a new computing device, a set of decisions may be made with respect to which user personas the device is targeting. For example, a given type of computing device may be designed for users that are expected to use the laptop device for word processing and web browsing. A second type of computing device may be designed for use in video processing. These different devices may have different thermal system designs due to the different usage patterns. Thus, different usage patterns may lead to different thermal system designs. However, when the computing device gets into the hands of a user, there is no way back to assess whether the computing device is suitable to that user. In other words, the user may use the computing device in a manner that is not compatible with the thermal system design.

Some approaches to assess the performance of the thermal system design include benchmarking. However, these benchmarking approaches rely on a set of personas that are expressed by a consistent set of applications over a period of time. Although it is built to be a comparison standard, a benchmarking approach may be biased or give misleading results if a portion of the target population (e.g., the user of the computing device) does not fit in the set of personas used by the benchmarking programs.

The present specification provides examples for ensuring that a thermal system design of a device will suit the specific usage pattern of an end-user. The described examples include the use of a trained neural network (also referred to as a neural network model) included with the device. The neural network is capable of detecting deviations between the end-user's activity and the expected activities for which the thermal system of the computing device was built. In an example, the neural network may be applied to enhance employee experience in a company by proactively informing an information technology (IT) administrator of unsuitability with the user and the computing device. For instance, if a device is being used in a manner that is incompatible with the thermal system design, the computing device may end up heating up more than expected, which may lead to more support calls, higher support costs, as well as lower user satisfaction. In another example, the neural network may detect applications trying to exploit security/safety vulnerabilities by running applications that overheat the device.

In some examples, the present specification describes a computing device. The computing device includes a database that includes a thermal dataset acquired during usage of a device. The computing device also includes a processor to train a neural network to determine suitability of the device for a user of the device based on the thermal dataset. The neural network includes an encoder trained to transform the thermal dataset to a first embedding vector. The neural network also includes a compression/decompression component trained to generate a second embedding vector that minimizes a difference from the thermal dataset based on the first. The neural network further includes a decoder trained to generate a second thermal dataset from the second embedding vector.

The present specification also describes a method. According to the method, a thermal dataset is acquired during usage of a device by a user. The method also includes transforming, by an encoder of a neural network, the thermal dataset to a first embedding vector. The method further includes generating, by a compression/decompression component of the neural network, a second embedding vector. A suitability score for the device and the user is determined based on the first embedding vector and the second embedding vector.

The present specification also describes a non-transitory machine-readable storage medium encoded with instructions executable by a processor of a computing device. When executed by the processor, the instructions cause the processor to acquire a first thermal dataset during usage of a device by a user. The instructions also cause the processor to transform, by an encoder of a neural network, the thermal dataset to a first embedding vector. The instructions further cause the processor to generate, by a compression/decompression component of the neural network, a second embedding vector that minimizes a difference from the thermal dataset based on the first. The instructions also cause the processor to generate, by a decoder of the neural network, a second thermal dataset from the second embedding vector. The instructions additionally cause the processor to determine a mismatch metric based on the first thermal dataset and the second thermal dataset.

As used in the present specification and in the appended claims, the term "a number of" or similar language is meant to be understood broadly as any positive number including 1 to infinity.

As used in the present specification and in the appended claims, the term, "processor" may be a controller, an application-specific integrated circuit (ASIC), a semiconductor-based microprocessor, a central processing unit (CPU), and a field-programmable gate array (FPGA), and/or other hardware device.

As used in the present specification, the term "memory" may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement the functionality described herein.

Turning now to the figures, FIG. 1 is a block diagram of a computing device (102) for determining device suitability, according to an example of the principles described herein. As described above, a neural network (110) may be trained to represent a set of usage patterns based on a thermal dataset (106) generated from users when using a device. The described examples include two phases: a neural network training phase, and neural network inferencing phase.

With regard to the training phase, the neural network (110) may be trained to learn usage patterns that are suitable for a given device. In some examples, the device for which the neural network (110) is being trained may be the computing device (102) itself. In some examples, the device for which the neural network (110) is being trained may be a device other than the computing device (102). For instance, a thermal dataset (106) may be captured on a given device, which then provides the thermal dataset (106) to the computing device (102).

It should be noted that in the case of training the neural network (110), training may occur on a single computing device (102). In other examples, training the neural network (110) may be distributed across multiple computing devices (102) with separate databases (104) and processors (108). For ease of explanation, an example of a single computing device (102) for training the neural network (110) is described herein.

The computing device (102) may include a database (104) and a processor (108). The database (104) may be stored in memory (not shown). In some examples, a database (104) may include a thermal dataset (106) acquired during usage of a device. For example, the thermal dataset (106) may be generated from data captured by a plurality of sensors on the device. In some examples, the device may be the computing device (102). In some examples, the device may be a device other than the computing device (102).

In an example, a first user with an expected usage pattern for the computing device (102) may be selected and a first device (e.g., a device of a given type, model, etc.) may be provided to the user. The first device may be designed to be suitable for the usage pattern of the first user. This first user may be referred to as a training user, as their usage of the device is used to train the neural network (110) to detect suitable (i.e., compatible) usage for the device.

In some examples, a set of users (referred to as training users) with an expected usage patterns may be provided with a given device to obtain data for the thermal dataset (106). The users may use the same device (e.g., at different times) or may use different devices of the same type (e.g., the same device model). In this case, the thermal dataset (106) may include data captured from a plurality of devices. The neural network (110) may be trained to determine device suitability based on the data captured from the plurality of devices. An example of this approach is described in FIG. 2.

Figure 2:
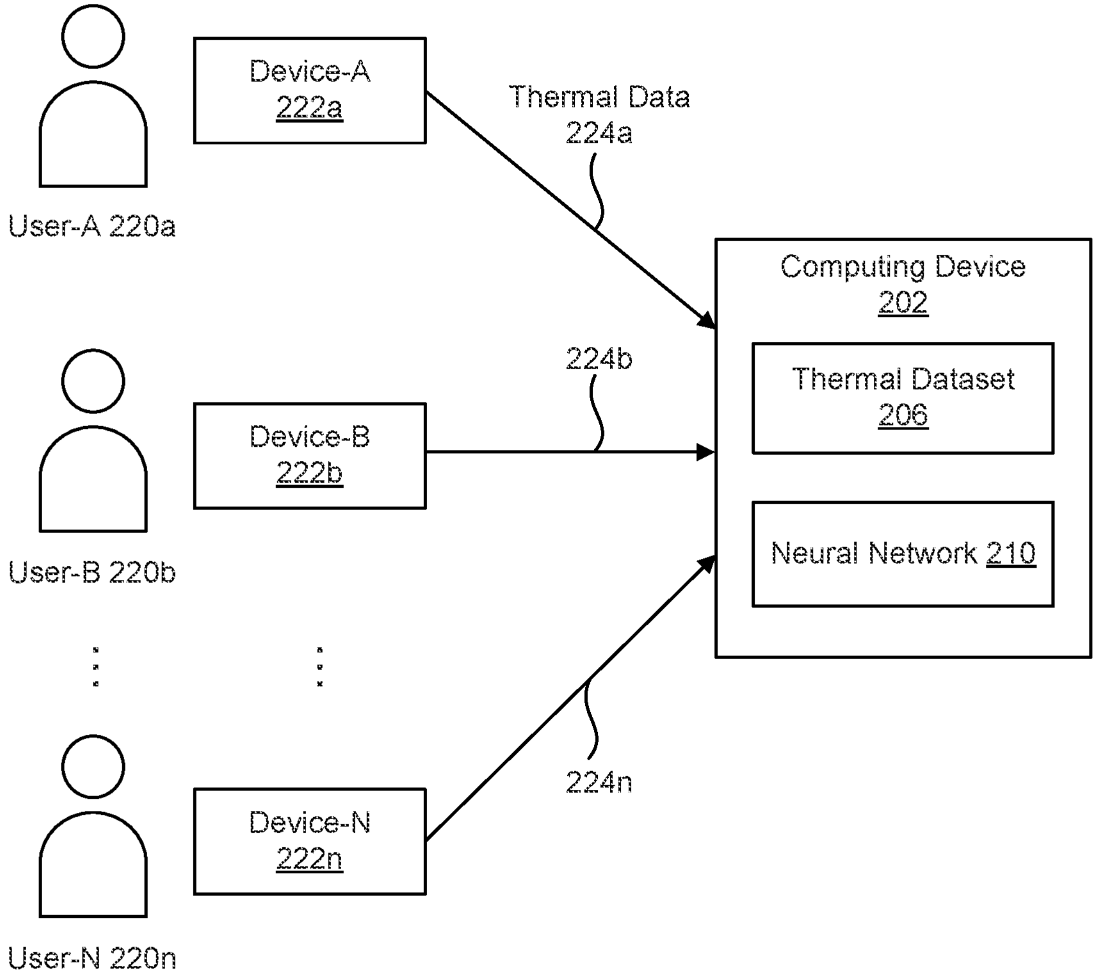
FIG. 2 illustrates training a neural network to determine device suitability, according to an example of the principles described herein.

Referring briefly to FIG. 2, a number of users (220*a-n*) may be provided devices (222*a-n*). For instance, user-A (220*a*) may be provided with device-A (222*a*), user-B (220*b*) may be provided with device-B (222*b*), and so forth. In some examples, the devices (222*a-n*) may be of the same type (e.g., model). The users (220*a-n*) may have a usage pattern that is suitable for the design of the devices (222*a-n*). For example, the types of activities that the users (220*a-n*) perform on the devices (222*a-n*) may be compatible with the thermal systems of the devices (222*a-n*).

The devices (222*a-n*) may provide thermal data (224*a-n*) to a computing device (202). In some examples, the computing device (202) may combine the thermal data (224*a-n*) into a thermal dataset (206) that is used to train the neural network (210) to recognize suitable usage of the devices (222*a-n*). It should be noted that in some examples, the accumulation of the thermal dataset (206) may occur before the devices (222*a-n*) are being sold on the market (e.g., during development/validation phases). In some examples, but the thermal dataset (206) may be generated, and the neural network (210) may be trained and applied at any time (e.g., after the devices (222*a-n*) are sold on the market).

In some examples, the devices (222*a-n*) may be installed with a set of data collection instructions to capture the thermal data (224*a-n*) used to generate the thermal dataset (206) given a set of start/stop conditions. In some examples, the thermal dataset (206) includes temperature data. For instance, the temperature data may include CPU Temperature, CPU case temperature (Tcase), and/or CPU junction temperature (Tjunction). In some examples, the temperature data may include GPU temperature (e.g., in some cases from multiple sensors). In some examples, the temperature data may include storage (e.g., memory) temperature (e.g., in some cases from multiple sensors), battery temperature, display temperature, ambient temperature, and/or other temperature from sensors spread over the device.

In some examples, the thermal dataset (206) may include cooling-device data. For example, the cooling-device data may include fan pulse width modulation (PWM) values, fan rotation per minute (RPM), fan percentage (e.g., percentage of total RPM), etc.

In some examples, the thermal dataset (206) may include power-consumption data. For example, the power-consumption data may include power consumption of the device. The power consumption may include the total system power consumption and a breakdown by component (e.g., CPU, storage, fan, display, etc.). The power-consumption data may include usage of components (e.g., CPU, GPU, memory, storage, network, battery). The power-consumption data may include the battery state (e.g., AC or DC, charging or discharging, etc.).

In some examples, the thermal dataset (206) may include time-period data for the usage of the device. For example, the thermal dataset (206) may include a timestamp for when the device is used.

In some examples, the thermal dataset (206) may include mobility data. For example, the thermal dataset (206) may include information about whether a device is being used in a mobile context (e.g., a user is moving with the device) or whether the device is stationary.

In some examples, the devices (222*a-b*) may include start/stop conditions to trigger when to capture the thermal data. For example, capturing thermal data may impact performance and energy usage of the device. Therefore, a device may record thermal data when conditions are met. In some examples, a device may capture the thermal data if the fan percentage meets a threshold (e.g., if fan %>30% currently AND fan %<20% before 5 seconds). In another example, the device may capture thermal data if the CPU temperature is greater than a threshold (e.g., CPU temperature >90 degrees Celsius). While the conditions for recording are met, the device may sample thermal data periodically (e.g., every 1 second).

In some examples, the device may stop capturing thermal data if conditions are met. For example, if the fan percentage is less than a threshold (e.g., if fan %<20%), then the device may stop capturing the thermal data. In other examples, the device may stop capturing thermal data if the CPU temperature is less than a threshold.

After the set of users (220*a-n*) finishes the usage time period T, which may be of any length, the thermal dataset (206) is built. It should be noted that in some examples, neither application name, nor user data is captured. In other words, the thermal dataset (206) may exclude an application name and user data. Thus, the described examples may be agnostic of application information and user data.

Returning now to FIG. 1, the neural network (110) may be trained to learn usage patterns based on the thermal data captured in the thermal dataset (106). The neural network (110) may capture thermal data patterns. In some examples, the thermal data may be multi-dimensionally correlated (e.g., multiple sensors sampled at the same time and possibly sharing causal factors may be correlated). The thermal data may be temporally correlated (e.g., past thermal behavior may predict future thermal behavior).

As used herein, multidimensional correlation includes correlation between variables. For example, two distinct time-series variables may correlate at a given time instant (e.g., multi-dimensional/multi-variable correlation) or with a lag of time (e.g., temporally correlated, for example: fan speed is correlated with temperature within a few seconds). It should be noted that temporal correlation may happen within the same time-series. For example, ambient temperature may be correlated with temperature 10 minutes back, where the temperature will be +/−0 to 2 degrees.

In some examples, the neural network (110) may include an encoder (112) that is trained to transform the thermal dataset (106) to a first embedding vector. The encoder (112) is trained to reduce the multi-dimensional and temporal data of the thermal dataset (106) into a single vector representation. As used herein, an embedding is a mapping of a discrete variable to a vector of continuous numbers. In the context of the neural network (110), embeddings are low-dimensional, learned continuous vector representations of discrete variables. Neural network embeddings reduce the dimensionality of categorical variables and meaningfully represent categories in a transformed space.

The neural network (110) also includes a compression/decompression component (114) trained to generate a second embedding vector that minimizes a difference from the thermal dataset (106) based on the first embedding vector. The neural network (110) also includes a decoder (116) trained to generate a second thermal dataset from the second embedding vector. A detailed example of the components of the neural network (110) is described in FIG. 3.

Figure 3:
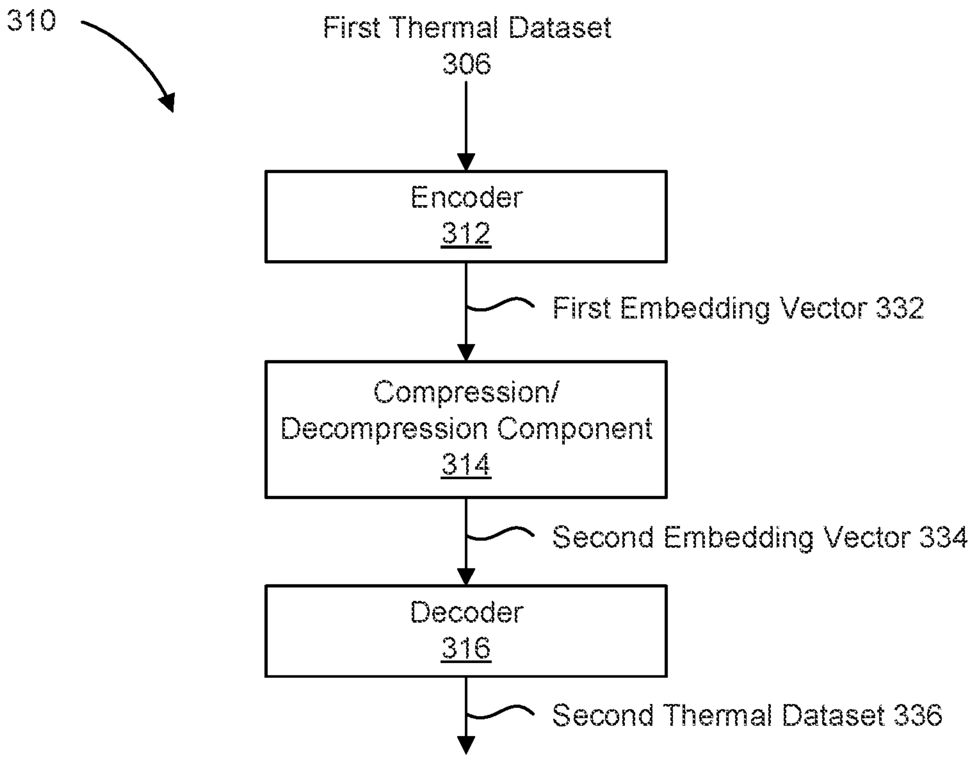
FIG. 3 is block diagram of a neural network for determining device suitability, according to an example of the principles described herein.

Referring now to FIG. 3, in some examples, the encoder (312) of the neural network (310) may receive a time slice of a first thermal dataset $D_1$ (306). For example, the time slice from first thermal dataset $D_1$ (306) may include data from a first user, among the set of users. In this case, $D_1$ (306) is a matrix of shape $|s|\times|t|$ with the s-ith row corresponding to sensor $s\in S$, and the t-ith column corresponding to time $t\in T$. The matrix $D_1$ (306) is encoded into a rich and dense representation called the first embedding vector $E_1$ (332) of shape $|E_1|\times 1$. Different time frames of the thermal dataset (306) (e.g., coming from a second user) may generate different values on the first embedding vector (332), but with the same shape.

In some examples, the encoder (312) may be trained using a transformer machine learning model. In some examples, a transformer implements a multi-head attention concept where every single time instant is correlated (e.g., paid attention to) with any of the N previous time instants. A single time instant may be correlated with multiple time instants, not just a single time instant.

The neural network (310) also includes a compression/decompression component (314) trained to generate a second embedding vector (334) that minimizes a difference from the thermal dataset (306) based on the first embedding vector $E_1$ (332). The compression/decompression component (314) is trained to learn the most meaningful information out of $E_1$ (332) to generate a second embedding vector $E_2$ (334) with minimal loss, difference, or dissimilarity from $E_1$ (332). Due to the large number of samples within the dataset, a fitting algorithm may be used to train the neural network (310) to recognize meaningful information in $E_1$ (332). The neural network (310) may be neural network fitted with a forward and back propagation algorithm, and an optimization algorithm (e.g., stochastic gradient descent). These algorithms may be defined during implementation or experimentation. Over a number of epochs/iterations using the dataset, each layer of the neural network (310) would learn what it has to learn. In some examples, each component of the neural network (310) may be trained separately, then the components may be combined and fine-tuned with less data or fewer iterations.

Working like a 'bottleneck', the compression/decompression component (314) forces the neural network (310) to learn to recover the input data (e.g., the first embedding vector $E_1$ (332)). In some examples, the compression/decompression component (314) may be trained using an autoencoder or a variational autoencoder. The encoding of the second embedding vector $E_2$ (334) generated by the compression/decompression component (314) may be validated and refined by attempting to regenerate the input from the second embedding vector encoding. The compression/decompression component (314) may learn a representation (encoding) for a set of data through training to ignore insignificant data (e.g., "noise").

The neural network (310) also includes a decoder (316) trained to generate a second thermal dataset $D_2$ (336) from the second embedding vector $E_2$ (334). The decoder (316) may be trained to generate a second thermal dataset $D_2$ (336) with a similar shape as the first thermal dataset $D_1$ (306). For expected usage patterns the second thermal dataset $D_2$ (336) will be similar to $D_1$ (306). However, if the neural network (310) does not know the usage pattern, the resulting $D_2$ (336) will be different from $D_1$ (306).

In some examples, the architecture of the encoder (312) and the decoder (316) may be implemented as a recurrent neural network (RNN) or a transformer machine learning model. It should be noted that the described architecture is unsupervised, given that there is no manual labeling. Thus, in these examples, data capturing, and training are performed without labeling.

Figure 4:
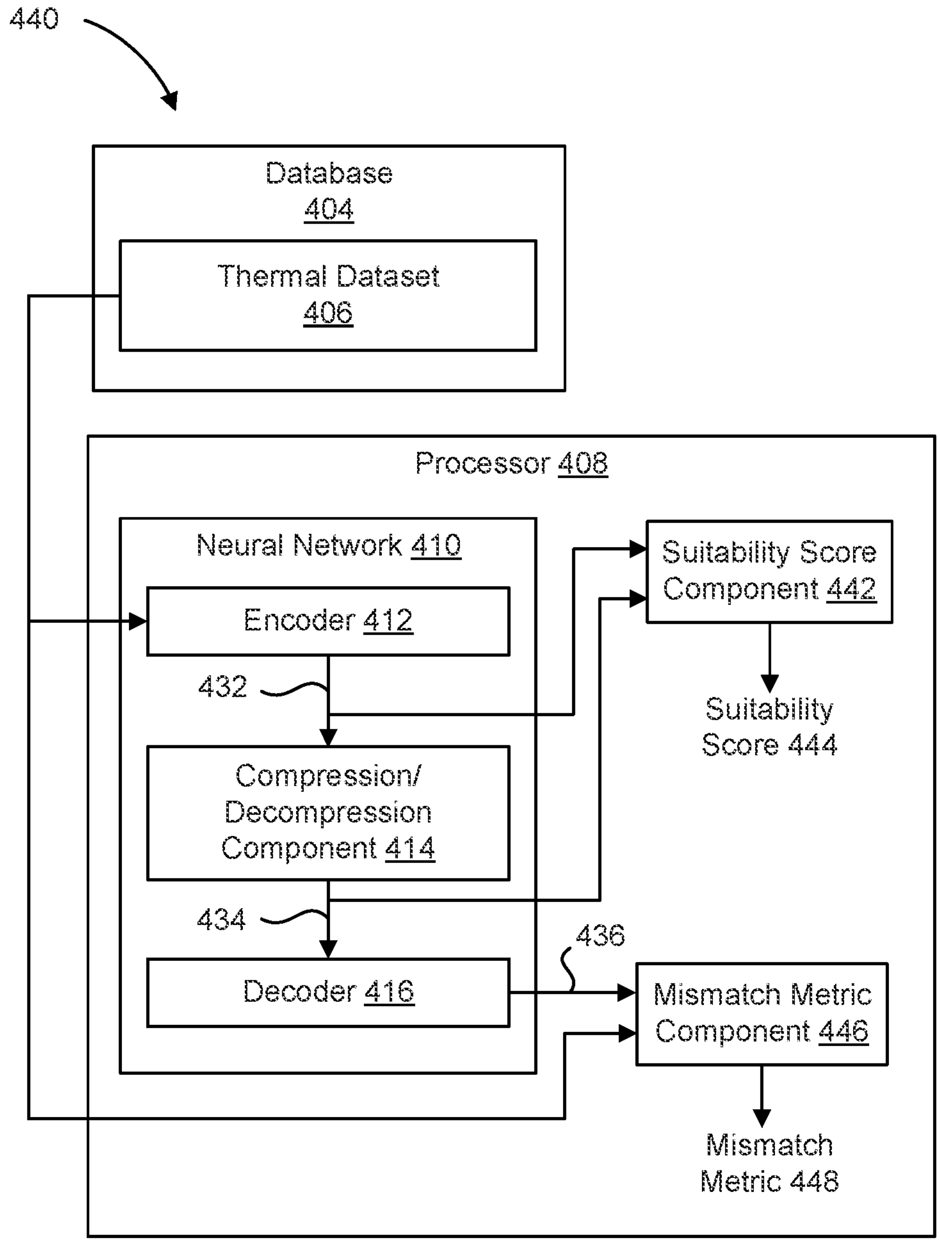
FIG. 4 is a block diagram of a device with a neural network for determining device suitability, according to an example of the principles described herein.

FIG. 4 is a block diagram of a device (440) with a neural network (410) for determining device suitability. As described above, once the neural network (410) is trained to recognize expected usage patterns, the neural network (410) may be used to determine the suitability of a device (440) for a user of the device (440) based on a given thermal dataset (406). This process may be referred to as inferencing.

In some examples, the processor (408) of the device (440) may implement the neural network (410). In some examples, a cloud service may receive the thermal dataset (406) from the device (440) and the cloud service may implement the neural network (410). For ease of explanation, the example of FIG. 4 illustrates the case where the neural network (410) is implemented on the device (440) that is being evaluated for user suitability. In some examples, the thermal dataset (406) may be stored in a database 404 located on the device (440).

At inference time, a thermal dataset (406) denoted by $$D_1^3 \; ($$

(to distinguish from the training thermal dataset described in FIGS. 1-3) is captured from a user using the device (440).

The thermal dataset (406) may be captured following the same set of start/stop conditions that were used to capture the training thermal dataset (106) as in FIG. 1. It should be noted that the user may or may not be in the first set of users that generated the training thermal dataset (106) or FIG. 1. For example, the user of device (440) may be anyone using the device 440, whereas the first set of users generating the training thermal dataset (106) of FIG. 1 may be a set of curated users with specific/expected usage patterns.

The neural network (410) may receive the thermal dataset $$D_1^3 \; (406).$$

(406). As described in FIG. 3, the neural network (410) outputs the first embedding vector $$E_1^3 \; (432),$$

(432), the second embedding vector $$E_2^3 (434),$$

(434), and the second thermal dataset $$D_2^3 \; (436).$$

(436).

The processor (408) may implement a suitability score component (442) to determine a suitability score (444) for the device (440) and the user based on the first embedding vector (432) and the second embedding vector (434). The suitability score (444) may indicate whether the usage pattern of the user is compatible (e.g., suitable) with the device (440). In some examples, the first embedding vector $$E_1^3 \; (432)$$

(432) is compared with the second embedding vector $$E_2^3 \; (434).$$

(434). In some examples, the suitability (444) (e.g., $c \in C$ with $C \in [0, 1]$) is calculated based on this comparison. In this case, C is the range of possible similarities that goes from 0 to 1, and c is an example of C, where C comes from cosine similarity or other similarity metrics. In some examples, the suitability (444) is calculated using cosine similarity. In this case, the higher the suitability, the more suitable the device (440) is to the user.

In some examples, the suitability score (444) may be compared to a suitability threshold to determine whether the device (440) is suitable for the user. For instance, if the suitability score (444) is equal to or greater than the suitability threshold, then the device (440) may be considered suitable for the user. If the suitability score (444) is less than the suitability threshold, then the device (440) may be considered unsuitable for the user. In the case that the device (440) is found to be unsuitable for the user, the processor (408) may generate a notification indicating the unsuitability.

The processor (408) may implement a mismatch metric component (446) to determine a mismatch metric (448) indicating a reason for unsuitability of the device (440) to the user. For example, the mismatch metric (448) indicates a parameter in the first thermal dataset (406) that deviates from an expected usage pattern. The mismatch metric component (446) may compare thermal dataset $$D_1^3 \ (406)$$

(406) and the second thermal dataset $$D_2^3 \ (436)$$

(436) with a time-series similarity metric (e.g., Dynamic Time Warping). A source for a mismatch between the device (440) and the user may be determined based on the time-series similarity metric. This comparison may result in the mismatch metric (448) that highlights potential new, unknown, or different usage patterns than the usage patterns for which the device (440) was intended. For example, the mismatch metric (448) may indicate that fan usage and CPU temperature is greater than what would occur with expected usage patterns. The mismatch metric (448) information may be a source to start an interaction with the user to recommend a different device. In some examples, the mismatch metric (448) may trigger the development of a new device targeting an unknown and interesting set of users.

In some examples, the processor (408) may generate a user notification that includes the mismatch metric (448). For example, upon identifying the mismatch metric (448), the processor (408) may generate a user notification (e.g., dialog message, email, etc.) that includes the mismatch metric (448). This may inform an IT administrator or the user of the reason for why the device (440) is unsuitable for the user.

In some examples, the inference processes may be performed based on a condition being met. Running the decoder (416) may be time consuming and resource intensive. Thus, the mismatch metric (448) may be run on demand or when there is a consistently low suitability score (444). For example, the decoder (416) may output the second thermal dataset $$D_2^3 \ (436)$$

to determine the mismatch metric (448) in response to the suitability score (444) being below the suitability threshold for a period of time (e.g., multiple days, weeks, etc.).

The described examples may be used to enhance manageability of an organization. For example, enterprise companies may enhance employee experience by determining suitable a device (440) is to their employees. When a device (440) does not suit the behavior of a user, the most suitable device may be proactively found by running the user's usage pattern (as captured by the thermal dataset (406)) against the thermal suitability neural network model of each available device.

In an example of device subscription, devices sold to consumers in subscription mode could have the neural network (41) running. Whenever there is a disconnect of the user usage pattern and the device-expected pattern, the user may be notified that there is a second device better matching the user's usage pattern. The second device may be sent to the user's location (e.g., home, office, etc.).

In an example of device search/purchase, a user may want to buy a device. In this case, the thermal dataset (406) acquired from a first device (440) may be used to identify a second device that better matches the thermal dataset (406).

In a security example, the neural network (410) may also protect against attackers exploiting gaps on the thermal design to overheat the device (440), which may harm the user, the device (440), or other resources. When unsuitability is detected, the cooling system may be activated at maximum (e.g., fans running at maximum speed). Furthermore, heat sources may be aggressively throttled down. Additionally, the processor (408) may alert the user or a company that someone else may be maliciously managing the device.

As seen by this discussion, these examples provide automated methods to assess the suitability of the thermal design to specific user criteria and usage patterns. These examples provide a neural network (410) that is capable of capturing temporal correlation of sensors inside of a device (440). These examples also provide an automated method to select workloads and benchmarks based on current user data (e.g., the thermal dataset (406)). These examples provide a single neural network (410) with multiple usages, including anomaly detection (that drives the suitability score (444)) as well as time-series generation (that drives the mismatch metric (448)).

Figure 5:
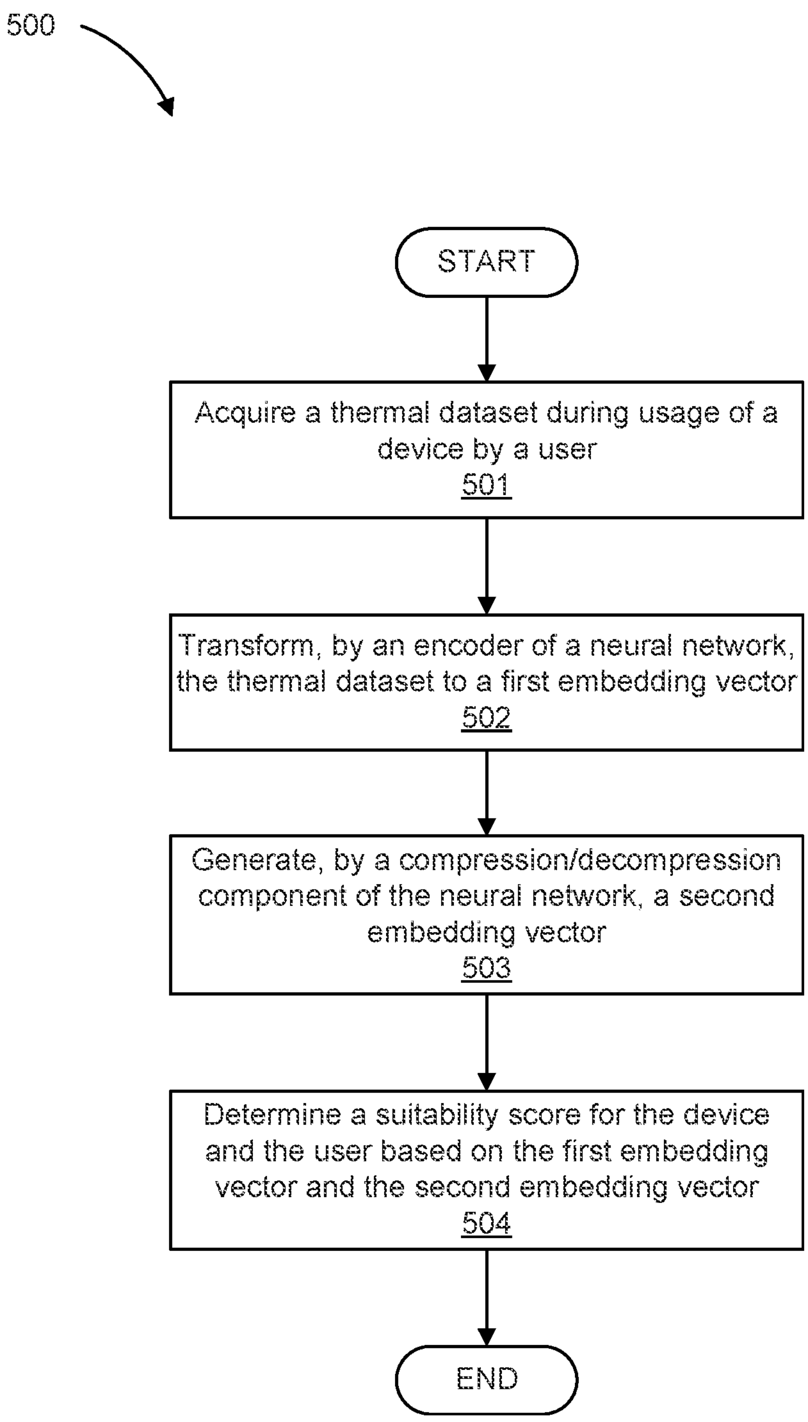
FIG. 5 is a flowchart of a method for determining device suitability with a neural network, according to an example of the principles described herein.

FIG. 5 is a flowchart of a method (500) for determining device suitability with a neural network (FIG. 4, 410), according to an example of the principles described herein. According to the method (500), a thermal dataset (FIG. 4, 406) is acquired (block 501) during usage of a device (FIG. 4, 440) by a user. In some examples, the thermal dataset is generated from data captured by a plurality of sensors on the device. the thermal dataset comprises temperature data, cooling-device data, power-consumption data, mobility data, or a combination thereof. The thermal dataset may also include time-period data for the usage of the device. In some examples, the thermal dataset is acquired based on a set of start/stop conditions that cause the device to capture the thermal dataset.

An encoder (FIG. 4, 412) of a neural network (FIG. 4, 410) may transform (block 502) the thermal dataset to a first embedding vector (FIG. 4, 432). The encoder may be trained to reduce the multi-dimensional and temporal data of the thermal dataset into a single vector representation.

A compression/decompression component (FIG. 4, 414) of the neural network may generate (block 503) a second embedding vector (FIG. 4, 434). The compression/decompression component may be trained to generate the second embedding vector to minimize a difference from the thermal dataset as represented by the first embedding vector.

A suitability score (FIG. 4, 444) may be determined (block 504) for the device and the user based on the first embedding vector and the second embedding vector. For example, determining the suitability score may include comparing the second embedding vector to the first embedding vector. Determining the suitability score may then include determining whether the difference between the second embedding vector and the first embedding vector exceeds a suitability threshold indicating suitability of the device and the user. In some examples, the suitability is calculated using cosine similarity. In some examples, determining the suitability score includes determining whether the suitability exceeds a threshold value indicating suitability of the device and the user.

Figure 6:
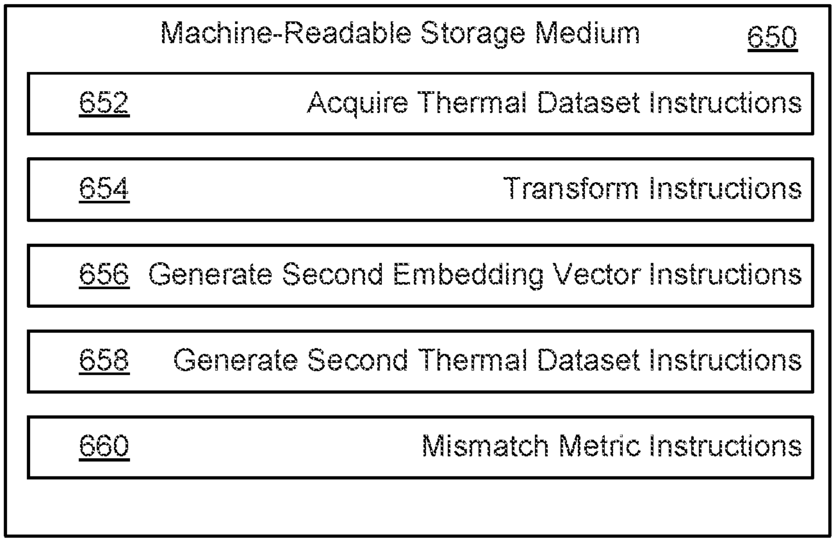
FIG. 6 depicts a non-transitory machine-readable storage medium for determining device suitability with a neural network, according to an example of the principles described herein.

FIG. 6 depicts a non-transitory machine-readable storage medium (650) for determining device suitability with a neural network (FIG. 4, 410), according to an example of the principles described herein. To achieve its desired functionality, the computing device (FIG. 1, 100) and/or device (FIG. 4, 440) include various hardware components. Specifically, the device (FIG. 4, 440) includes a processor (FIG. 4, 408) and a machine-readable storage medium (650). The machine-readable storage medium (650) is communicatively coupled to the processor (FIG. 4, 408). The machine-readable storage medium (650) includes a number of instructions (652, 654, 656, 658, 660) for performing a designated function. In some examples, the instructions may be machine code and/or script code.

The machine-readable storage medium (650) causes the processor to execute the designated function of the instructions (652, 654, 656, 658, 660). The machine-readable storage medium (650) can store data, programs, instructions, or any other machine-readable data that can be utilized to operate the device (FIG. 4, 440). Machine-readable storage medium (650) can store machine readable instructions that the processor (FIG. 4, 408) of the computing device (FIG. 4, 440) can process, or execute. The machine-readable storage medium (650) can be an electronic, magnetic, optical, or other physical storage device that contains or stores executable instructions. Machine-readable storage medium (650) may be, for example, Random-Access Memory (RAM), an Electrically Erasable Programmable Read-Only Memory (EEPROM), a storage device, an optical disc, etc. The machine-readable storage medium (650) may be a non-transitory machine-readable storage medium (650).

Referring to FIG. 6, acquire thermal dataset instructions (652), when executed by the processor (FIG. 4, 408), cause the processor (FIG. 4, 408) to acquire a first thermal dataset during usage of the device by a user. Transform instructions (654), when executed by the processor (FIG. 4, 408), cause the processor (FIG. 4, 408) to transform, by an encoder of a neural network, the thermal dataset to a first embedding vector. Generate second embedding vector instructions (656), when executed by the processor (FIG. 4, 408), cause the processor (FIG. 4, 408) to generate, by a compression/decompression component of the neural network, a second embedding vector that minimizes a difference from the thermal dataset based on the first embedding vector. Generate second thermal dataset instructions (658), when executed by the processor (FIG. 4, 408), also cause the processor (FIG. 4, 408) to generate, by a decoder of the neural network, a second thermal dataset from the second embedding vector.

Mismatch metric instructions (660), when executed by the processor (FIG. 4, 408), cause the processor (FIG. 4, 408) to determine a mismatch metric based on the first thermal dataset and the second thermal dataset. The mismatch metric indicates a parameter in the first thermal dataset that deviates from an expected usage pattern. Determining the mismatch metric may include comparing the first thermal dataset and the second thermal dataset to determine a time-series similarity metric. A source for a mismatch between the device and the user may be determined based on the time-series similarity metric.

What is claimed is:

1. A method, comprising:

acquiring a thermal dataset during usage of a device by a user, the thermal dataset being generated from data captured by sensors of the device; and transforming, by an encoder of a neural network, the thermal dataset to a first embedding vector;

generating, by a compression/decompression component of the neural network, a second embedding vector;

determining a suitability score for the device and the user based on the first embedding vector and the second embedding vector, the suitability score indicating whether the usage pattern of the user is compatible with the device;

comparing the suitability score to a suitability threshold; and in response to the suitability score being less than the suitability threshold, generating a notification and activating a cooling system of the device.

2. The method of claim 1, wherein the thermal dataset is acquired based on a set of start/stop conditions that cause the device to capture the thermal dataset.

3. The method of claim 1, wherein the compression/decompression component generates the second embedding vector to minimize a difference from the thermal dataset.

4. The method of claim 1, wherein determining the suitability score comprises:

comparing the second embedding vector to the first embedding vector to determine a difference between the second embedding vector and the first embedding vector; and determining whether the difference between the second embedding vector and the first embedding vector exceeds a suitability threshold indicating suitability of the device and the user.

5. The method of claim 1, wherein determining the suitability score comprises:

determining whether the suitability exceeds a threshold value indicating suitability of the device and the user.

6. The method of claim 1, wherein the encoder of the neural network receives a time slice of a first thermal dataset.

7. The method of claim 1, wherein the architecture of the encoder is implemented as a recurrent neural network (RNN) or a transformer machine learning model.

8. The method of claim 7, wherein the transformer machine learning model implements a multi-head attention concept where every time instant is correlated with any of N previous time instants.

9. The method of claim 1, wherein the thermal dataset comprises temperature data, cooling-device data, power-consumption data, or a combination thereof.

10. The method of claim 9, wherein the thermal dataset excludes an application name and user data.

11. The method of claim 1, wherein the thermal dataset comprises temperature data comprising: CPU temperature, CPU case temperature, CPU junction temperature, GPU temperature, storage temperature, battery temperature, display temperature, or ambient temperature.

12. The method of claim 1, wherein the encoder is trained to reduce multi-dimensional and temporal data of the thermal dataset into a single vector representation.

13. The method of claim 1, wherein the compression/decompression component is trained using an autoencoder or a variational autoencoder.

14. The method of claim 13, wherein the compression/decompression component learns a representation for a set of data through training to ignore insignificant data.

15. The method of claim 1, wherein, in response to the suitability score being less than the suitability threshold, the cooling system of the device is activated at maximum speed.

* * * * *